United States Patent
Edara et al.

(10) Patent No.: US 9,014,922 B2
(45) Date of Patent: Apr. 21, 2015

(54) SYSTEM AND METHOD FOR OPTIMIZING A CUT LOCATION

(71) Applicant: Caterpillar Inc., Peoria, IL (US)

(72) Inventors: Thandava K. Edara, Peoria, IL (US); Michael Taylor, Swissvale, PA (US); Timothy Felty, East Peoria, IL (US); Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 203 days.

(21) Appl. No.: 13/722,399

(22) Filed: Dec. 20, 2012

(65) Prior Publication Data

US 2014/0180548 A1 Jun. 26, 2014

(51) Int. Cl.
*G06F 17/00* (2006.01)
*G06F 19/00* (2011.01)
*G01C 21/30* (2006.01)
*E02F 3/76* (2006.01)
*G05B 13/02* (2006.01)
*E02F 9/20* (2006.01)
*E02F 9/26* (2006.01)

(52) U.S. Cl.
CPC .............. *G05B 13/024* (2013.01); *E02F 9/205* (2013.01); *E02F 9/261* (2013.01); *E02F 9/262* (2013.01)

(58) Field of Classification Search
USPC ............... 701/48, 49, 50, 400, 408, 409, 410, 701/300; 74/1 R; 37/381, 382; 172/2, 4.5
See application file for complete search history.

(56) References Cited

U.S. PATENT DOCUMENTS

| | | | |
|---|---|---|---|
| 4,926,948 A | 5/1990 | Davidson et al. |
| 5,462,122 A | 10/1995 | Yamamoto et al. |
| 5,875,854 A | 3/1999 | Yamamoto et al. |
| 5,984,018 A | 11/1999 | Yamamoto et al. |
| 6,076,030 A | 6/2000 | Rowe |
| 6,181,999 B1 | 1/2001 | Yamamoto et al. |
| 6,223,110 B1 | 4/2001 | Rowe et al. |
| 6,421,627 B1 | 7/2002 | Ericsson |
| 6,655,465 B2 | 12/2003 | Carlson et al. |
| 6,845,311 B1 | 1/2005 | Stratton et al. |
| 7,676,967 B2 | 3/2010 | Gharsalli et al. |
| 8,031,629 B2 | 10/2011 | Stegmaier et al. |
| 2002/0162668 A1 | 11/2002 | Carlson et al. |
| 2004/0168358 A1 | 9/2004 | Stump |
| 2007/0044980 A1 | 3/2007 | Stratton et al. |
| 2010/0299031 A1 | 11/2010 | Zhdanov et al. |

FOREIGN PATENT DOCUMENTS

WO WO 2008/118027 A2 10/2008

*Primary Examiner* — Thomas Tarcza
*Assistant Examiner* — Edward Pipala
(74) *Attorney, Agent, or Firm* — Leydig, Voit & Mayer, Ltd.

(57) ABSTRACT

A system for determining a cut location at a work surface includes a position sensor and a controller. The controller stores a desired operating parameter and a final design plane of the work surface and determines an actual profile of the work surface. The controller determines a plurality of target profiles corresponding to different cut locations. The target profiles are based at least in part upon the cut location, a loading profile, slot parameters, and the actual profile of the work surface. The controller further determines an optimized target profile relative to the desired operating parameter and the optimized target profile defines an optimized cut location.

20 Claims, 5 Drawing Sheets

(12) United States Patent
US 9,014,922 B2

SYSTEM AND METHOD FOR OPTIMIZING A CUT LOCATION

TECHNICAL FIELD

This disclosure relates generally to controlling a machine and, more particularly, to a system and method for planning a path of a work implement to optimize an operating parameter related to a material moving operation.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations such as digging, loosening, carrying, etc., different materials at the worksite.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Movement of the machines and their associated work implements are often developed by a planning system or module. A plurality of variables may affect the planning system and impact the efficiency of the machine operation. It is often desirable to ensure that the machines perform the material movement operations such that the materials are moved in an efficient manner. For example, it may be desirable to ensure that the locations at which the machines begin to alter the work surface, and/or the profiles along which the machines alter the work surface, are chosen such that the machines function efficiently.

PCT Patent Publication No. WO 2008/0118027 discloses a method of contour shaping by a machine equipped with a cutting implement. The method includes providing a desired topographical plan, measuring the real time position of at least one of the machine and the cutting implement, generating instructions to move the cutting implement, plotting a transitional path from the real time position of the machine or the cutting implement to a point on the desired topographical plan, and using the transitional path and the real time position of the machine or the cutting implement to generate the instructions to move the cutting implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining an optimized cut location for a work implement of a machine along a work surface includes a position sensor associated with the machine for generating position signals indicative of a position of the work surface and a controller. The controller is configured to store a desired operating parameter, to receive position signals from the position sensor, to determine the position of the work surface based upon the position signals to define an actual profile of the work surface, and to determine a plurality of target profiles extending along the path. Each target profile corresponds to a different cut location and each of the plurality of target profiles is based at least in part upon one of the cut locations, a loading profile of the work implement, slot parameters along at least a portion of the path, and the actual profile of the work surface. The controller is further configured to select an optimized target profile relative to the desired operating parameter and the optimized target profile defines an optimized cut location.

In another aspect, a method for determining an optimized cut location for a work implement of a machine along a path includes storing a desired operating parameter, receiving position signals from a position sensor indicative of a position of the work surface, determining a position of the work surface based upon the position signals to define an actual profile of the work surface, and determining a plurality of target profiles extending along the path. Each target profile corresponds to a different cut location and each of the plurality of target profiles is based at least in part upon one of the cut locations, a loading profile of the work implement, slot parameters along at least a portion of the path, and the actual profile of the work surface. The method further includes selecting an optimized target profile relative to the desired operating parameter and the optimized target profile defines an optimized cut location.

In still another aspect, a machine includes a prime mover, a ground engaging work implement for engaging a work surface along a path, a position sensor for generating position signals indicative of a position of the work surface, and a controller. The controller is configured to store a desired operating parameter, to receive position signals from the position sensor, to determine the position of the work surface based upon the position signals to define an actual profile of the work surface, and to determine a plurality of target profiles extending along the path. Each target profile corresponds to a different cut location and each of the plurality of target profiles is based at least in part upon one of the cut locations, a loading profile of the work implement, slot parameters along at least a portion of the path, and the actual profile of the work surface. The controller is further configured to select an optimized target profile relative to the desired operating parameter and the optimized target profile defines an optimized cut location.

DETAILED DESCRIPTION

Figure 1:
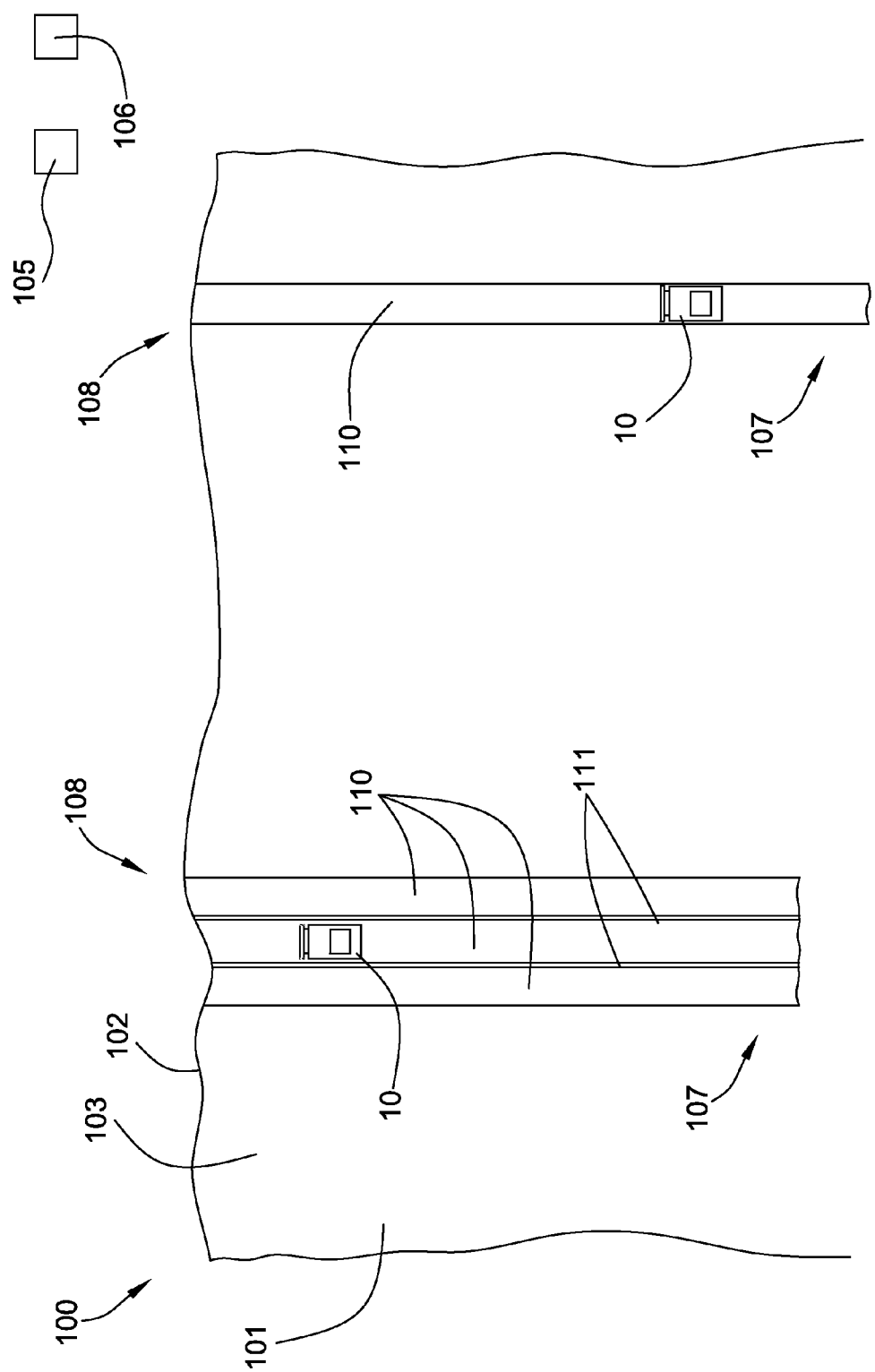
FIG. 1 shows a schematic view of a work site at which a machine incorporating the principles disclosed herein may be used.

FIG. 1 depicts a diagrammatic illustration of a work site 100 at which one or more machines 10 may operate in an autonomous, a semi-autonomous, or manual manner. Work site 100 may be a portion of a mining site, a landfill, a quarry, a construction site, or any other area in which movement of material is desired. Tasks associated with moving material may include a dozing operation, grading operation, a leveling operation, a bulk material removal operation, or any other type of operation that results in alteration of the current topography at work site 100. As depicted, work site 100 includes a work area 101 having a crest 102 defining an edge of a ridge, embankment, high wall or other change in elevation. Work surface 103 may take any form and refers to the actual profile or position of the terrain of the work area.

As used herein, a machine 10 operating in an autonomous manner operates automatically based upon information received from various sensors without the need for human operator input. As an example, a haul truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
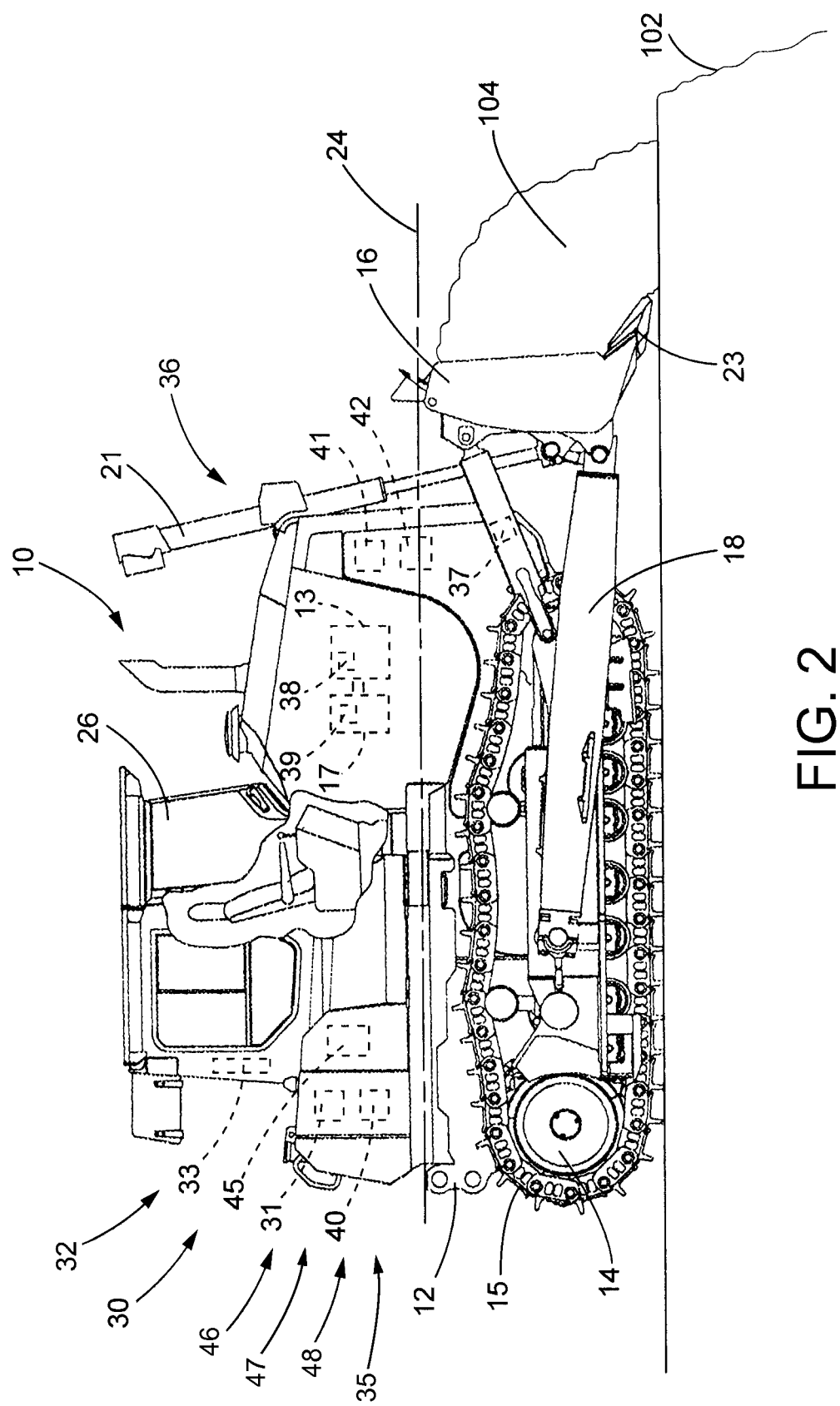
FIG. 2 shows a diagrammatic illustration of a machine in accordance with the disclosure.

FIG. 2 shows a diagrammatic illustration of a machine 10 such as a dozer adjacent crest 102 with a work implement or a blade 16 pushing material 104 over the crest. The machine 10 includes a frame 12 and a prime mover such as an engine 13. A ground-engaging drive mechanism such as a track 15 is driven by a drive wheel 14 on each side of machine 10 to propel the machine 10. Although machine 10 is shown in a "track-type" configuration, other configurations, such as a wheeled configuration, may be used. Operation of the engine 13 and a transmission (not shown) which are operatively connected to the drive wheels 14 and tracks 15 may be controlled by a control system 30 including a controller 31. Other types of prime movers and drive systems are contemplated.

Machine 10 may include a ground engaging work implement such as blade 16 pivotally connected to frame 12 by arms 18 on each side of machine 10. First hydraulic cylinder 21 coupled to frame 12 supports blade 16 in the vertical direction, and allows blade 16 to move up or down vertically from the point of view of FIG. 2. Second hydraulic cylinders 22 on each side of machine 10 allow the pitch angle of blade tip 23 to change relative to a centerline 24 of the machine.

Machine 10 may be equipped with a plurality of sensors that provide data indicative (directly or indirectly) of various operating parameters of the machine. A hydraulic system may include sensors for monitoring pressure within the system as well as the pressure of specific cylinders. For example, one or both of the second hydraulic cylinders 22 may include an associated pressure sensor 37. Sensors may be provided to monitor the operating conditions of the engine 13 and the associated drivetrain such as an engine speed sensor 38 and a torque converter speed sensor 39. The machine may also include an accelerometer 40 for determining the acceleration of the machine along various axes. Still further, a pitch angle sensor 41 and a pitch rate sensor 42 may be included for determining roll, pitch and yaw of machine 10. Other sensors necessary or desirable for operating the machine 10 may be provided.

Machine 10 may be controlled by a control system 30 that interacts with a positioning system such as a global positioning system ("GPS") to monitor and/or control the movement of the machine about the work site 100. The control system 30 may be located on the machine 10 and/or may be located at a command center 105 (FIG. 1) located remotely from the machine. In certain embodiments, the functionality of control system 30 may be distributed so that certain functions are performed at machine 10 and other functions are performed at command center 105. For example, a network system such as wireless network system 106 (FIG. 1) may provide generalized commands or information to the machine 10 that the portions of control system 30 on the machine utilize to generate specific commands to operate the various systems of machine 10. In the alternative, aspects of the control system 30 remote from the machine 10 may provide some or all of the specific commands that are then transmitted by the wireless network system 106 to systems of the machine. Machine 10 may be one of several machines operating at work site 100, each of which may communicate with the wireless network system 106.

Rather than operating the machine 10 in an autonomous manner, an operator may have the ability to operate the machine 10 remotely such as with a wireless control unit 45. Still further, machine 10 may also include a cab 26 that an operator may physically occupy and provide input to control the machine. Cab 26 may include one or more input devices through which the operator issues commands to control the propulsion and steering of the machine as well as operate various implements associated with the machine. In one embodiment, machine 10 may be configured to be operated autonomously, semi-autonomously, or manually. In case of semi-autonomous or manual operation, the machine may be operated by remote control and/or by an operator physically located within the cab 26.

The control system 30, as shown generally by an arrow in FIG. 2 indicating association with the machine 10, may include an electronic control module or controller 31. The controller 31 may receive input command signals from the wireless network system 106, remote control input command signals from an operator operating machine 10 remotely, or operator input command signals from an operator operating the machine 10 from within cab 26. The controller 31 may control the operation of the drivetrain as well as the hydraulic systems that operate the ground engaging work implement such as blade 16. The control system 30 may include one or more sensors to provide data and other input signals representative of various operating parameters of the machine 10. The term "sensor" is meant to be used in its broadest sense to include one or more sensors and related components that may be associated with the machine 10 and that may cooperate to sense various functions, operations, and operating characteristics of the machine.

The controller 31 may be an electronic controller that operates in a logical fashion to perform operations, execute control algorithms, store and retrieve data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 31 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 31 may be implemented in hardware and/or software without regard to the functionality. The controller 31 may rely on one or more data maps relating to the operating conditions of the machine 10 that may be stored in the memory of controller. Each of these data maps may include a collection of data in the form of tables, graphs, and/or equations.

A position sensing system 32, as shown generally by an arrow in FIG. 2 indicating association with the machine 10, may include a position sensor 33 to sense a position of the machine relative to the work area 101. The position sensor 33 may include a plurality of individual sensors that cooperate to provide signals to controller 31 to indicate the position of the machine 10. The controller 31 may determine the position of the machine 10 within work area 101 as well as the orientation of the machine such as its heading, pitch and roll. In doing so, the dimensions of the machine 10 may be stored within the controller 31 with the position sensing system defining a datum or reference point on the machine and the controller using the dimensions to determine the position of the terrain or work surface 103 upon which the machine is moving. Such position sensor 33 may be a series of GPS sensors, an odometer or other wheel rotation sensing sensor, a perception based system or may use other systems such as lasers to determine the position of machine 10.

Machine 10 may be configured to move material at the work site 100 according to one or more material movement plans from an initial location 107 to a spread or dump location 108. The dump location 108 may be at crest 102 or at any other location. The material movement plans may include, among other things, forming a plurality of spaced apart channels or slots 110 that are cut into the work surface at work site 100 along a path from the initial location 107 to the dump location 108. In doing so, each machine 10 may move back and forth along a linear path between the initial location 107 and the dump location 108. If desired, a relatively small amount of material may be left or built up as walls 111 between adjacent slots 110 to prevent or reduce spillage and increase the efficiency of the material moving process. The walls 111 between the slots 110 may be moved after the slots are formed or periodically as desired. The process of moving material through slots 110 while utilizing walls 111 of material to increase the efficiency of the process is sometime referred to as "slot dozing."

Figure 3:
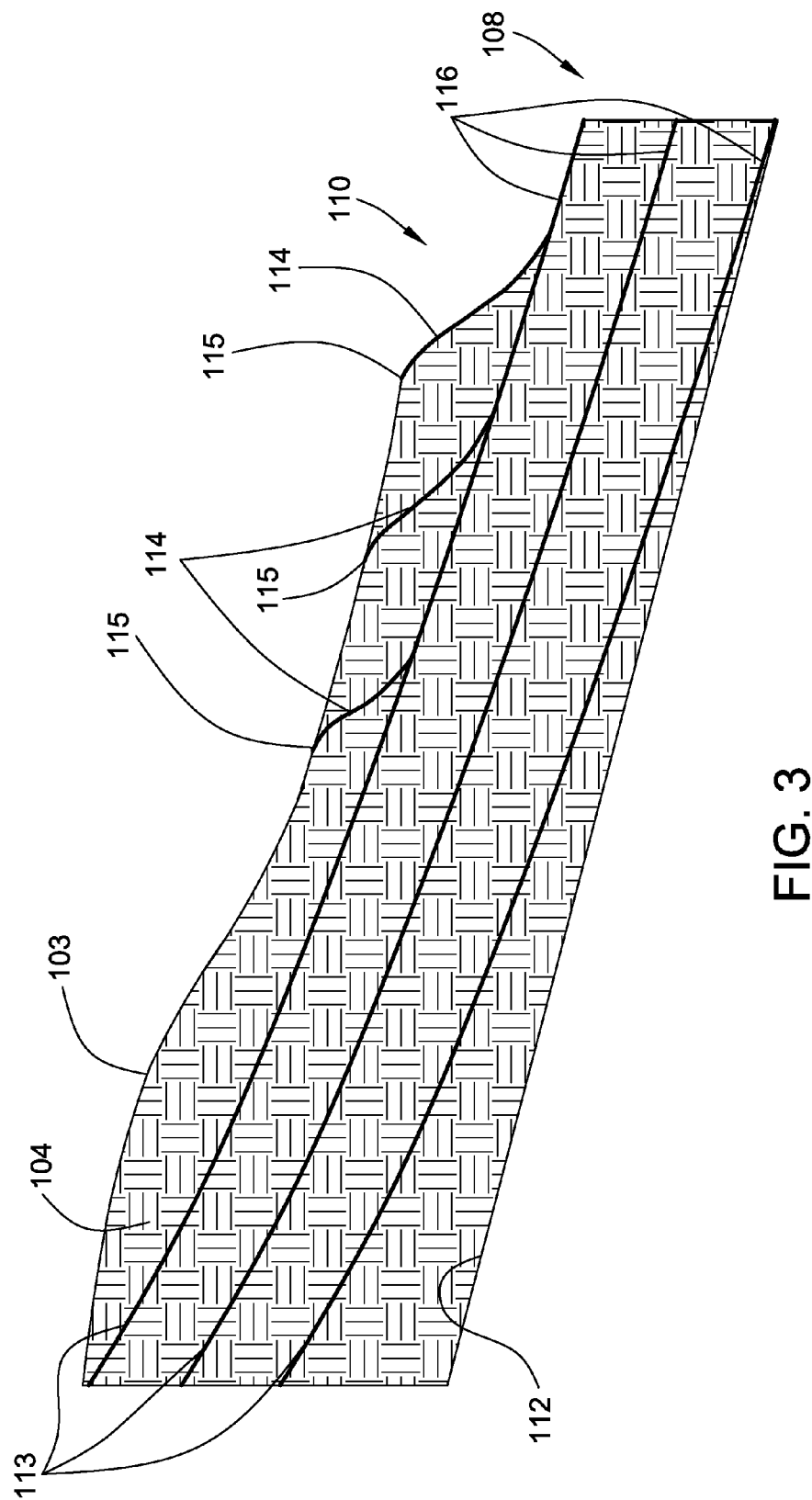
FIG. 3 shows a cross-section of a portion of a work site depicting various aspects of a material moving plan.

As depicted in FIG. 3, in one embodiment, each slot 110 may be formed by initially setting the desired parameters of the final work surface or final design plane 112. Material may be removed from the work surface 103 in one or more layers or passes 113 until the final design plane 112 is reached. The blade 16 of machine 10 may engage the work surface 103 with a series of cuts 114 that are spaced apart lengthwise along the slot 110. Each cut 114 begins at a cut location 115 along the work surface 103 at which the blade 16 initially engages the work surface and extends into the material 104 towards the pass target or carry surface 116 for a particular pass. Controller 31 may be configured to guide the blade 16 along each cut 114 until reaching the carry surface 116 and then follow the carry surface towards the dump location 108.

Figure 4:
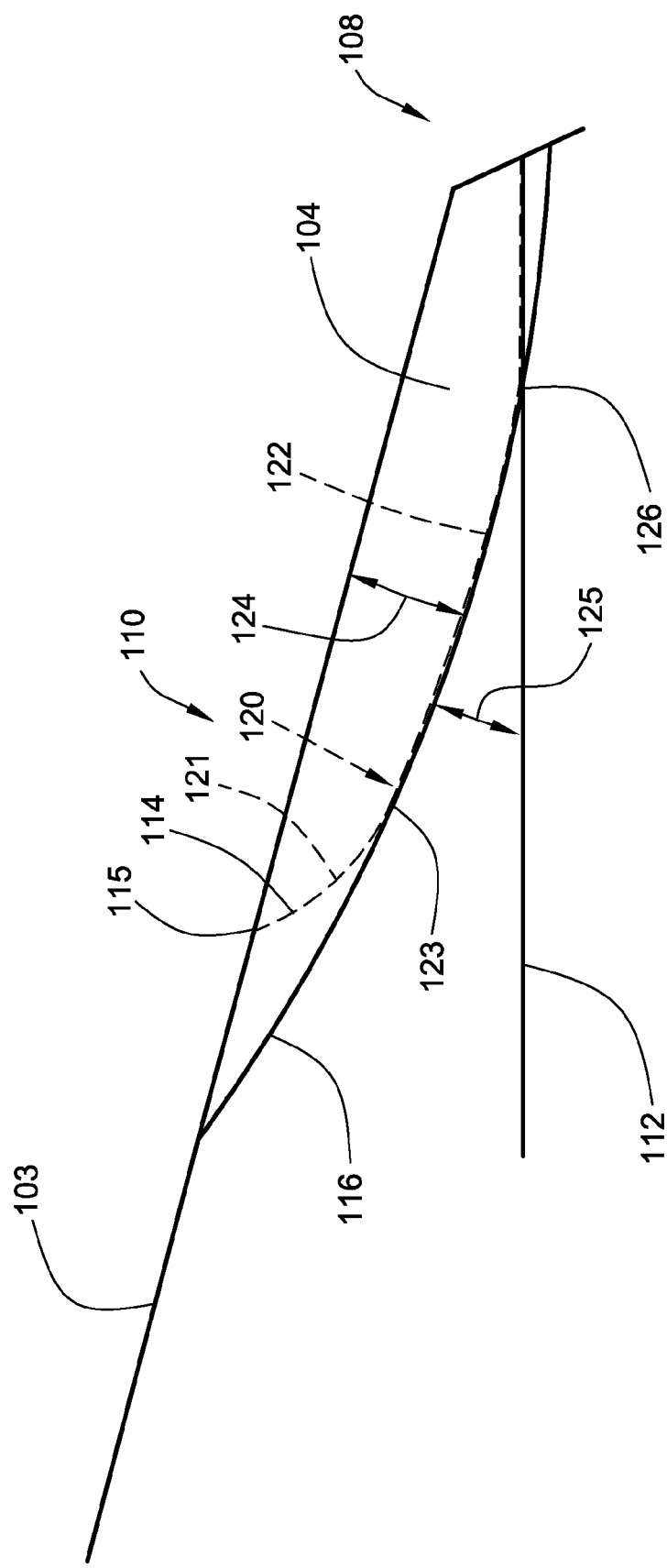
FIG. 4 shows a diagrammatic cross-section of a portion of a work site depicting a potential target profile.

During each material moving pass, the controller 31 may be configured to guide the blade 16 generally along a desired path or target profile 120 depicted by dashed line 120 in FIG. 4 from the cut location 115 to the dump location 108. A first portion 121 of the target profile 120 extends from the cut location 115 to the carry surface 116. The first portion 121 may be referred to as the loading profile as that is the portion of the target profile 120 at which the blade 16 is loaded with material. A second portion 122 of the target profile 120 extends from the intersection 123 of the cut 114 and the carry surface 116 to the dump location 108. The second portion 122 may be referred to as the carry profile as that is the portion of the target profile 120 at which the blade 16 carries the load along the carry surface 116.

The first portion 121 or loading profile may have any configuration and, depending on various factors including the configuration of the work surface 103 and the type of material to be moved, some cut profiles may be more efficient than others. The loading profile may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 103 or the final design plane 112 may change from segment to segment.

The second portion 122 or carry profile may have any configuration but is often generally linear and sloped downward so that movement of material will be assisted by gravity to increase the efficiency of the material moving process. In other words, the carry profile is often configured so that it slopes downward towards the dump location 108. The carry profile (sometimes referred to as the slot parameters) may define the shape of the carry surface 116, the depth of the carry surface 116 below an uppermost surface of the work surface 103 as indicated by reference number 124, and the angle of the carry surface as indicated by reference number 125. In some instances, the angle 125 of the carry surface may be defined relative to a gravity reference or relative to the final design plane 112.

Although it may be generally desirable for the blade 16 to follow the target profile 120, performance characteristics of the machine 10 and/or desired operating efficiencies may cause a deviation from the target profile 120. More specifically, as blade 16 makes a cut 114, the load on the blade will increase. Further, as the blade 16 travels along the carry surface 116, the load on the blade will likely continue to increase. If the blade 16 is overloaded for a particular slope, the machine 10 may slip and/or cause excess wear on the machine. Accordingly, the control system 30 may include a blade control system 46 to maximize the efficiency of the material moving process.

In one embodiment, the blade control system 46 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load at a range of approximately 70-90% of the maximum torque. Other values and ranges are contemplated. In order to maintain the load at a desired value or within a desired range, the blade control system 46 may raise or lower the blade 16 to decrease or increase the amount of material carried by the blade 16 and thus decrease or increase the load. It should be noted that since the work surface 103 may be at different angles relative to a gravity reference, the load on the blade 16 corresponding to a particular load (e.g. 80% of the maximum machine load) will likely vary depending on the slope at which the machine 10 is operating.

The control system 30 may include an implement load monitoring system 35 shown generally by an arrow in FIG. 2. The implement load monitoring system 35 may include a variety of different types of implement load sensors depicted generally by an arrow in FIG. 2 as an implement load sensor system 36 to measure the load on the blade 16. In one embodiment, the implement load sensor system 36 may embody one or more pressure sensors 37 for use with one or more hydraulic cylinder, such as second hydraulic cylinders 22, associated with blade 16. Signals from the pressure sensor 37 indicative of the pressure within the second hydraulic cylinders 22 may be monitored by controller 31. The load on the blade 16 may be correlated to the load on the engine 13 by controller 31. Other manners of determining a change in cylinder pressure associated with a change in the load on blade 16 are contemplated, including other manners of measuring the pressure within second hydraulic cylinders 22 and measuring the pressure within other cylinders associated with the blade.

The load on the blade 16 may be affected by the slope of the terrain upon which the machine 10 is moving. Accordingly, if desired, the accuracy of the implement load measurement may be increased by utilizing the implement load sensor system 36 in conjunction with a slope or inclination sensor such as pitch angle sensor 41. For example, if the machine 10 is moving uphill, the load on the blade 16 may be higher due to gravity as compared to a machine operating in the same conditions on flat terrain. Similarly, the load on the blade 16 may be lower for the same conditions when operating the machine in a downhill orientation. By determining the slope of the terrain, the controller 31 may more accurately determine changes in the load on the blade 16.

If desired, a machine load monitoring system 47 may be included in control system 30. The machine load monitoring system 47 may utilize the engine speed sensor 38 and the torque converter speed sensor 39 to measure a difference between the speed of the engine 13 and the torque converter 17 to determine the load on the machine 10.

Control system 30 may also include a module or planning system 48 for determining or planning various aspects of the excavation plan. The planning system 48 may receive various types of input such as the configuration of the work surface 103, the final design plane 112, the cut location 115, a desired loading profile, a desired carry profile, and characteristics of the material to be moved. Operating characteristics and capabilities of the machine 10 such as maximum load may also be entered into the planning system 48. The planning system 48 may simulate the results of cutting at a particular cut location and for a particular target profile, and then choose a cut location that creates the most desirable results based on one or more criteria.

In one example, the planning system 48 may calculate a volume of material that will be moved by the blade 16 as it travels along a first target profile corresponding to a first cut location 115. Based on the calculated volume of material that will be moved, the planning system 48 may modify the cut location 115 to define a second target profile. The planning system 48 may then calculate a volume of material to be moved based upon the second target profile. This process may be iteratively repeated until the planning system 48 selects an acceptable cut location that meets some predetermined criteria. After the planning system 48 selects an acceptable cut location 115, the cut location and its corresponding target profile may be utilized to guide the machine and the blade 16 and move material along the path to the dump location 108.

In one embodiment, the planning system 48 may be part of the controller 31 and perform while operating the machine 10. In another embodiment, the calculations may be performed ahead of time and the various inputs to the planning system 48 and the resultant cut locations 115 and target profiles 120 stored as part of the data maps of the controller 31. In such case, upon setting the desired inputs and determining the configuration of the work surface 103, an acceptable cut location 115 and corresponding target profile 120 may be determined by the controller 31 through the use of its data maps.

FIG. 4 is an illustration of a potential cut 114 at work site 100 that may be generated by control system 30. Work surface 103 represents the uppermost height of the existing material at the slot 110. While the illustration is depicted in two dimensions, it should be appreciated that the data representing the illustration may be in three dimensions. For example, the data representing work surface 103 may include a plurality of data points that represent the uppermost height of existing material at a plurality of locations along work surface 103. This information may be obtained according to any method known in the art. In one example, the machine 10 may utilize the position sensing system 32 described above to map out the contour of work surface 103 as machine 10 moves across it. This data may also be obtained according to other methods such as by a vehicle that includes lasers and/or cameras. It should be noted that as the machine 10 moves material to the dump location 108, the position of the work surface 103 may be updated based upon the current position of the machine 10 and the position of the blade 16.

The loading profile begins at cut location 115 on work surface 103 and ends at carry surface 116. As depicted in FIG. 4, the loading profile may be generally arcuate with a generally symmetrical curve. The carry surface 116 may be generally arcuate and curved downward to utilize gravity in an advantageous manner. It should be noted that the carry surface 116 is depicted as passing below the final design plane 112. In such case, the controller 31 may be configured to guide the blade 16 so that it does not pass below the final design plane 112. In other words, the target profile 120 defined by the planning system 48 may direct the blade 16 to move along the cut 114 while loading the blade, to move along the carry surface 116 beginning at the intersection 123 of the cut 114 and the carry surface 116 until reaching the intersection 126 of the carry surface 116 and the final design plane 112 and then move along the final design plane until reaching the dump location 108. This path is depicted by a dashed line in FIG. 4.

As may be seen in FIG. 4, moving the blade 16 along the target profile 120 will result in a volume of material 104 being moved from slot 110. The planning system 48 may use the shape of the loading profile and the cut location 115 to determine the volume of material that would be moved by blade 16 if the machine 10 were to follow the target profile 120. More specifically, the planning system 48 may use three-dimensional data that is used to represent the machine 10, the work surface 103, and the target profile 120 to make a volumetric calculation of the volume of material that will be moved for a particular target profile 120.

The planning system 48 of control system 30 may also determine an optimum location for a cut 114. This optimum location may be based upon optimizing any of a number of desired operating parameters. These operating parameters may include a predetermined load on the machine 10, a predetermined load on the work implement or blade 16, a predetermined volume of material 104 being moved by the blade 16, maximizing smoothness or minimizing undulations of the work surface 103, or any other desired operating parameters. In doing so, the planning system 48 may operate in an iterative manner to determine the optimum position of the cut location 115. In other words and as described in more detail below, the planning system 48 may move the cut location 115 in a first direction until the cut location has been moved too far. The planning system 48 may then move the cut location 115 by smaller increments in a second direction opposite the first direction until the cut location has again been moved too far in the second direction or the cut location is optimized. If the cut location 115 is still not optimized, the planning system 48 may then move the cut location by still smaller increments back in the first direction until the cut location has been moved too far in the first direction or is optimized. This process of repeating directional movement and reducing the movement increment may be repeated until the cut location 114 is optimized.

Figure 5:
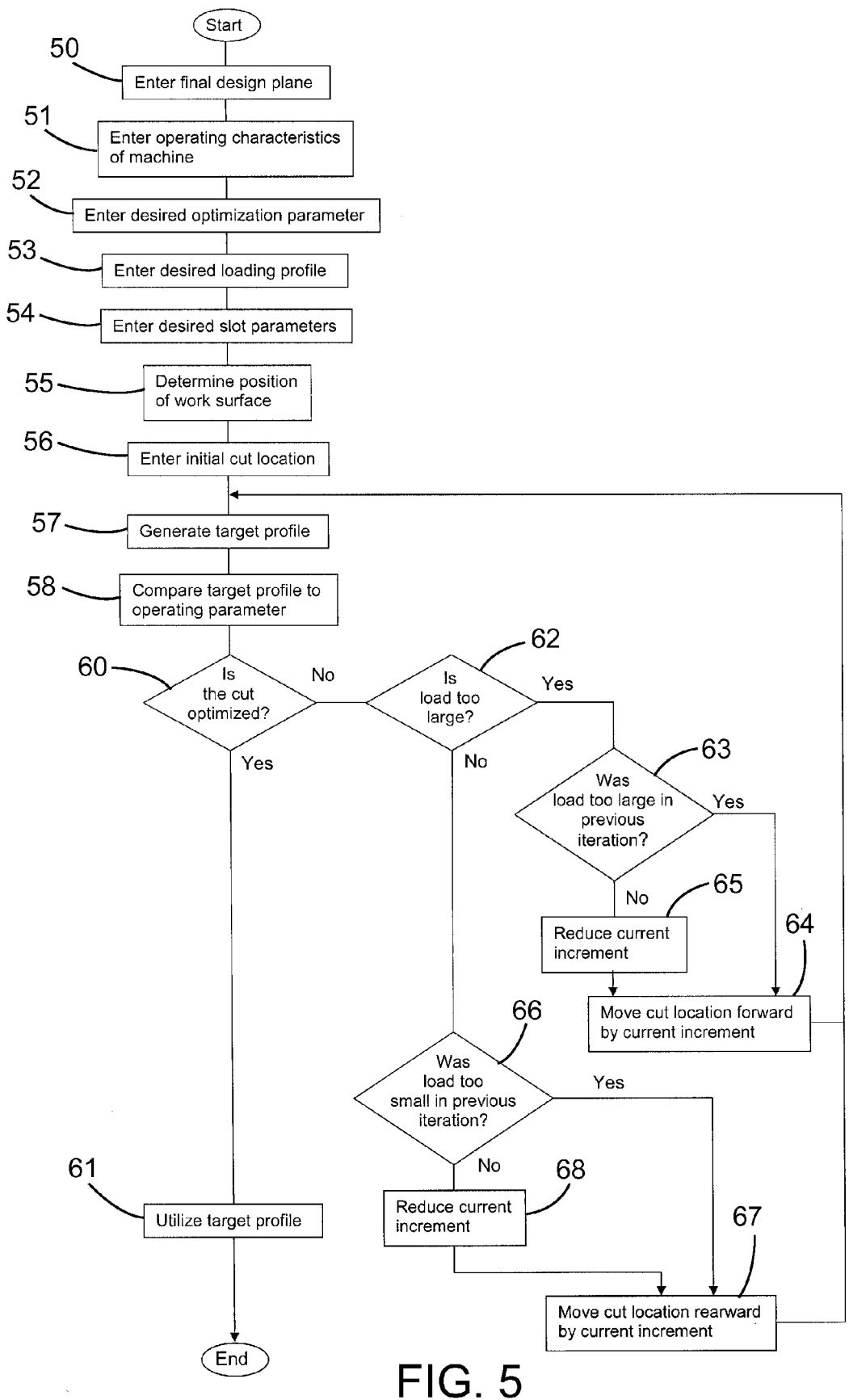
FIG. 5 shows a flowchart illustrating a cut optimization process in accordance with the disclosure.

FIG. 5 depicts such a process in which the planning system 48 may iteratively determine an optimum location for a cut 114. At stage 50, the final design plane 112 may be set within or entered into the controller 31. In one embodiment, the final design plane 112 may be entered by an operator or some other personnel. In another embodiment, the final design plane may be generated by the control system 30.

At stage 51, the operating characteristics of the machine 10 may be entered into controller 31. These operating characteristics may include a desired maximum load on the machine 10 and dimensions of the machine including those of blade 16. In an alternate embodiment, a desired maximum load on the blade 16 may be used rather than the maximum load on the machine 10. The dimensions of blade 16 may be used by controller 31 to determine the volume of material moved by the machine 10.

At stage 52, a desired optimization parameter may be entered into controller 31. The desired optimization parameter may be chosen from the desired operating parameters described above. In some embodiments, it may be possible to utilize or optimize more than one desired operating parameter.

At stage 53, the desired first portion 121 of the target profile 120 or loading profile may be entered into controller 31. As stated above, the loading profile may have many different configurations. If desired, the loading profile may be broken into a series of segments that may be equal or unequal in length and each segment may have a different shape or identical shapes. The angle of each of the segments may vary from segment to segment if desired.

At stage 54, the carry profile or slot parameters may be entered into controller 31. The carry profile may define the shape of the carry surface 116, the depth of the carry surface 116 below an uppermost surface 124 of the work surface 103, and the angle 125 of the carry surface 116 relative to a fixed reference. In FIG. 4, the angle 125 is depicted relative to the final design plane 112.

At stage 55, the position or configuration of the actual profile or work surface 103 may be determined. The configuration of the work surface 103 may be determined by a topographical map of the earth at the work area 101. In an alternate step, the configuration of the work surface 103 may be determined by moving a mapping vehicle along the work surface 103 to establish its configuration. In still another alternate step, the machine 10 may be moved along the work surface 103 and the position sensor 33 may provide a plurality of signals to controller 31 to indicate the position of the machine 10. The controller 31 may determine the position of the machine 10 within the work area 101 as well as the orientation of the machine such as its heading, pitch and roll. Based upon the known dimensions of the machine 10 stored within the controller 31 and the position sensor 33 defining a data or reference point on the machine, the controller 31 may determine the configuration of the work surface 103 over which the machine 10 is traveling.

An initial cut location 115 may be set or determined at stage 56 and entered into controller 31. At stage 57, the controller 31 may utilize any or all of the final design plane 112 entered at stage 50, the operating characteristics of the machine 10 entered at stage 51, the desired loading profile entered at stage 53, the desired slot parameters entered at stage 54, the position or configuration of the work surface 103 determined at stage 55, and the initial cut location 115 entered at stage 56 to generate a target profile 120.

The controller 31 may perform at stage 58 an analysis of the target profile 120 to analyze the target profile relative to the desired optimization parameter set at stage 52. At decision stage 60, the controller 31 may determine whether the target profile 120 results in performance that is sufficiently close to the desired optimization parameter or optimized for the cut location 115 set or entered at stage 56. A desired optimization parameter may be set as a predetermined number, as a predetermined range, or as some other predetermined factor such a predetermined number of occurrences of an event within a specific time period or distance. Determining whether a target profile is sufficiently close to the desired optimization parameter may be achieved in a variety of manners. In one embodiment, the controller 31 may be configured to determine whether machine performance based upon the target profile 120 will exceed a desired optimization parameter. In another embodiment, the controller may be configured to determine whether machine performance based upon the target profile 120 will fall within a desired range of an optimization parameter. Once a target profile 120 is determined that satisfies the optimization parameter, the cut location 115 may be utilized as an optimized cut location. In such case, the controller 31 may utilize at stage 61 the target profile 120 corresponding to the optimized cut location and issue operating commands to move the machine 10 and blade 16 along the target profile.

If the cut location 115 is not optimized at decision stage 60, the controller 31 may operate to change the location of cut 114 to generate a new cut location 115. In doing so, the controller 31 may analyze the target profile 120 and its performance relative to the desired optimization parameter. The controller 31 may change the cut location 115 to attempt to move the performance of the target profile 120 closer to the desired optimization parameter.

In the process depicted in FIG. 5, the controller 31 may move the cut location iteratively until the performance of the target profile 120 is sufficiently close to the desired optimization parameter. More specifically, after the controller 31 determines at decision stage 60 that the cut 114 is not optimized, the controller may determine how to move the cut location 115 to optimize the cut. If the load was greater than a predetermined value or range in a previous iteration through the planning system 48 (i.e., at the previous cut location 115), it may be desirable to move the next cut location 115 forward or towards the dump location 108 and away from the initial location 107. Moving the cut location 115 forward may reduce the volume of material 104 to be moved by the blade 16 and thus decrease the load on the machine 10. If the load was less than the predetermined value or range in a previous iteration through the planning system 48 (i.e., at the previous cut location 115), it may be desirable to move the next cut location 115 rearward or away from the dump location 108 and towards the initial location 107. Moving the cut location 115 rearward may increase the volume of material 104 to be moved by the blade 16 and thus increase the load on the machine 10.

When moving the cut location 115, the distance that the cut 114 is moved with each increment (i.e., the movement increment) may be established by setting an initial cut movement increment within the controller 31. Factors that may affect the size of the initial cut movement increment may include the characteristics of the machine 10, the terrain of the work site 100, and characteristics of the material to be moved. As the planning system 48 analyzes multiple cut locations 115, the size or length of the movement increment may be adjusted with each change in direction of movement of the cut location. Changing the length of the movement increment may reduce the number of iterations required to optimize the cut location 115. In one embodiment, the controller 31 may be configured to reduce the length of the movement increment by a predetermined percentage (e.g., 50%) each time the controller changes the direction of movement of the cut location 115.

As set forth in FIG. 5, the planning system 48 of the controller 31 may determine at stage 62 whether the load on the machine 10 for a current cut location 115 planning system 48 is too large. If the load is too large, the controller may determine at stage 63 whether the load was too large in a previous iteration through the planning system 48 (i.e., at the previous cut location 115). If the load is too large at stage 62 and was previously too large as determined at stage 63, the cut location 115 may be moved forward by the current movement increment at stage 64.

If the load was too large at decision stage 62 but not too large in the previous iteration, the movement increment for moving the cut location 115 may be reduced at stage 65. The cut location 115 may then be moved forward at stage 64 by the reduced movement increment.

If the load is not too large at stage 62, the controller may determine at stage 66 whether the load was too small in a previous iteration through the planning system 48 (i.e., at the previous cut location 115). If the load is not too large at stage 62 and was previously too small as determined at stage 66, the cut location 115 may be moved rearward by the current movement increment at stage 67.

If the load was not too large at decision stage 62 and was too small in the previous iteration, the movement increment for moving the cut location 115 may be reduced at stage 68. The cut location 115 may then be moved rearward at stage 68 by the reduced movement increment.

After moving the cut location rearward at stage 64 or forward at stage 68, a new target profile 120 may be generated at stage 57. The process of stages 57-68 may be repeated a plurality of times until an optimized cut location 115 is determined.

Through such an optimization process, the controller 31 may determine a plurality of target profiles 120 that extend along the path generally from the initial location 107 to the dump location 108 with each target profile corresponding to a different cut location 115. The controller 31 may analyze each target profile relative to the desired optimization parameter and determine an efficiency of each target profile relative to the desired optimization parameter. The efficiency of each target profile may be utilized to determine the optimized target profile. The optimized target profile will define an optimized cut location as well as the other parameters of the target profile.

As stated above, the planning system 48 may be part of the controller 31 and the planning function performed while operating the machine 10. In another embodiment, the planning function may be performed ahead of time and the various inputs to the planning system 48 and the resultant cut locations and target profiles stored as part of the data maps of the controller 31.

In an alternate process, rather than only adjusting the cut location 115 and determining the corresponding target profile, the controller 31 may alter other aspects of the blade or implement path and then determine a corresponding target profile. In doing so, the controller 31 may alter any combination of the cut location 115 together with the shape and the angle of the loading profile to achieve alternate implement paths. The controller 31 may then select the optimized target profile and its corresponding implement path.

Still further, rather than determine a single optimized target profile (and the corresponding optimized cut location or optimized implement path), the controller 31 may determine a set of optimized target profiles. In other words, rather than only analyze a single implement path or cut location, the controller 31 may analyze a plurality of sets of implement paths or cut locations so that the selected set is optimized. As an example, the controller 31 may analyze a first plurality of implement paths based upon the actual profile. The controller 31 may then analyze a second plurality of implement paths corresponding to each of the first plurality of implement paths and a third plurality of implement paths corresponding to each of the second implement paths. This process may be repeated a predetermined number of times as desired. An optimized set of implement paths may be selected based upon the analysis of the each set of implement paths. Although a set is described in the example above as having three or more implement paths, as used herein, a set may include any number of implement paths or cut locations including only one.

Industrial Applicability

The industrial applicability of the control system 30 described herein will be readily appreciated from the foregoing discussion. The foregoing discussion is applicable to machines 10 that move material at a work site 100. Machine 10 may include a system that will determine an optimum location for a cut 114. The optimum cut location 115 may be based upon optimizing any of a number of desired operating parameters. The operating parameters may include a variety of parameters including a predetermined load on the machine 10 or the blade 16, a predetermined volume of material 104 being moved by the blade 16, maximizing smoothness or minimizing undulations of the work surface 103, or any other desired operating parameters. The planning system 48 may operate in an iterative manner to determine the optimum position of the cut location 115.

The manner of operation of the planning system 48 such as the operating parameters to be optimized may be set by an operator, management of a site, or other personnel as desired. Such system permits the determination of the cut locations 115 based upon optimizing specific operating parameters as desired.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining an optimized cut location for a work implement of a machine along a work surface, comprising:
   a position sensor associated with the machine for generating position signals indicative of a position of the work surface;
   a controller configured to:
      store a desired operating parameter;
      receive position signals from the position sensor;
      determine the position of the work surface based upon the position signals to define an actual profile of the work surface;
      determine a plurality of target profiles extending along a path, each target profile corresponding to a different cut location, each of the plurality of target profiles being based at least in part upon one of the cut locations, a loading profile of the work implement, slot parameters along at least a portion of the path, and the actual profile of the work surface; and
      select an optimized target profile relative to the desired operating parameter, the optimized target profile defining an optimized cut location.

2. The system of claim 1, wherein the desired operating parameter is a predetermined load on the machine.

3. The system of claim 2, wherein the predetermined load is a predetermined percentage of a maximum load for which the machine is configured.

4. The system of claim 3, wherein the controller is configured to move the cut location in a first direction along the path if a load on the machine is greater than the predetermined percentage and move the cut location in a second direction along the path if a load on the machine is less than the predetermined percentage, the first direction being generally opposite the second direction.

5. The system of claim 1, wherein the desired operating parameter is a predetermined load on the work implement.

6. The system of claim 1, wherein the desired operating parameter is a predetermined volume of material.

7. The system of claim 1, wherein the desired operating parameter is minimizing undulations on the work surface.

8. The system of claim 1, wherein the path includes a dump location, and the controller is further configured to move the cut location of the work implement relative to the dump location when determining the plurality of target profiles.

9. The system of claim 1, wherein the controller is further configured to store a second desired operating parameter, and select the optimized target profile based upon both the desired operating parameter and the second desired operating parameter.

10. The system of claim 1, wherein the controller is further configured to determine the plurality of target profiles based at least in part upon a final design plane of the work surface.

11. A controller implemented method for determining an optimized cut location for a work implement of a machine along a path, comprising:
   storing a desired operating parameter;
   receiving position signals from a position sensor indicative of a position of the work surface;
   determining a position of the work surface based upon the position signals to define an actual profile of the work surface;
   determining a plurality of target profiles extending along a path, each target profile corresponding to a different cut location, each of the plurality of target profiles being based at least in part upon one of the cut locations, a loading profile of the work implement, slot parameters along at least a portion of the path, and the actual profile of the work surface; and
   selecting an optimized target profile relative to the desired operating parameter, the optimized target profile defining an optimized cut location.

12. The method of claim 11, wherein the desired operating parameter is a predetermined load on the machine.

13. The method of claim 12, wherein the predetermined load is a predetermined percentage of a maximum load for which the machine is configured.

14. The method of claim 13, further including moving the cut location in a first direction along the path if a load on the machine is greater than the predetermined percentage and moving the cut location in a second direction along the path if a load on the machine is less than the predetermined percentage, the first direction being generally opposite the second direction.

15. The method of claim 11, wherein the desired operating parameter is a predetermined load on the work implement.

16. The method of claim 11, wherein the desired operating parameter is a predetermined volume of material.

17. The method of claim 11, wherein the path includes a dump location, and further including moving the cut location of a work implement relative to the dump location when determining the plurality of target profiles.

18. The method of claim 11, further including determining an efficiency of each target profile relative to the desired operating parameter and utilizing the efficiency of each target profile to determine the optimized target profile.

19. The method of claim 11, further including determining the plurality of target profiles based at least in part upon a final design plane of the work surface.

20. A machine comprising:
   a prime mover;
   a ground engaging work implement for engaging a work surface along a path;
   a position sensor for generating position signals indicative of a position of the work surface; and
   a controller configured to:
      store a desired operating parameter;
      receive position signals from the position sensor;
      determine the position of the work surface based upon the position signals to define an actual profile of the work surface;
      determine a plurality of target profiles extending along a path, each target profile corresponding to a cut location, each of the plurality of target profiles being based at least in part upon one of the cut locations, a loading profile of the work implement, slot parameters along at least a portion of the path, and the actual profile of the work surface; and select an optimized target profile relative to the desired operating parameter, the optimized target profile defining an optimized cut location.

* * * * *

UNITED STATES PATENT AND TRADEMARK OFFICE
CERTIFICATE OF CORRECTION

PATENT NO. : 9,014,922 B2  Page 1 of 1
APPLICATION NO. : 13/722399
DATED : April 21, 2015
INVENTOR(S) : Edara et al.

It is certified that error appears in the above-identified patent and that said Letters Patent is hereby corrected as shown below:

Specification

Column 12, line 33, delete "Industrial Applicability" and insert -- INDUSTRIAL APPLICABILITY --.

Signed and Sealed this
Twenty-second Day of March, 2016

Michelle K. Lee
*Director of the United States Patent and Trademark Office*